United States Patent Office 3,555,690
Patented Jan. 19, 1971

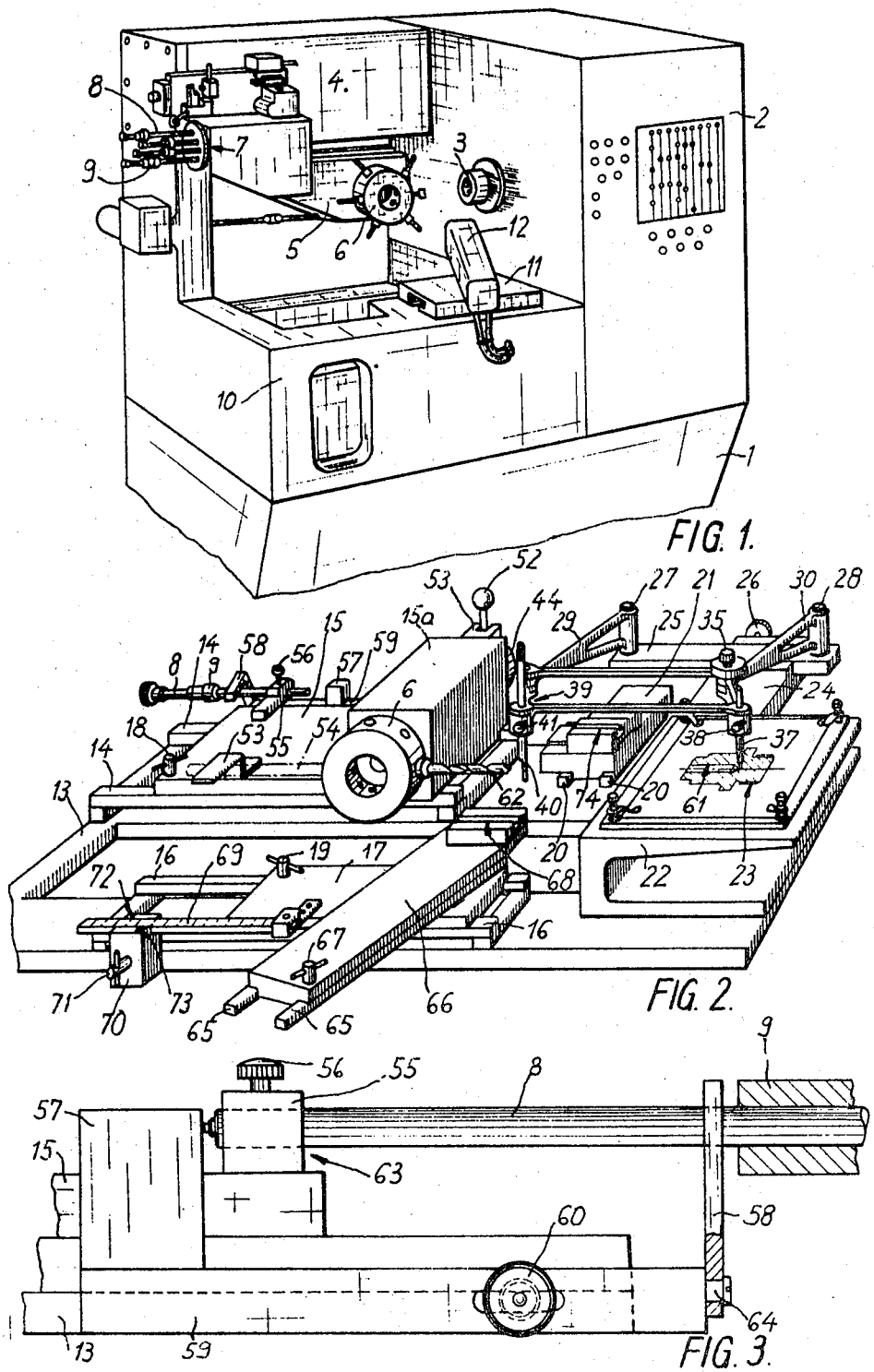

3,555,690
MACHINE-TOOL SIMULATOR
Maurice Matthey, Geneva, Switzerland, assignor to Tarex S.A., Geneva, Switzerland, a firm
Filed May 10, 1968, Ser. No. 728,227
Claims priority, application Switzerland, May 12, 1967, 6,793
Int. Cl. B27g 23/00
U.S. Cl. 33—185                                    19 Claims

ABSTRACT OF THE DISCLOSURE

In a machine-tool simulator by means of which a machine tool can be preset, movable elements for representing at least some of the movable parts of the machine and which are designed to carry out movements identical to those of the corresponding machine parts; means for determining the various positions occupied by the said elements and adapted to furnish information for presetting the machine; a table for receiving a drawing of the component for whose machining the machine tool is to be set up; a pantograph device carrying on the one hand a needle designed to be placed at an arbitrary point on the drawing and on the other hand an index indicating the position, on the machine, at which there will be located that point on the workpiece which corresponds to the point on the drawing at which the said needle is located.

---

This invention relates to a machine-tool simulator by means of which a machine tool can be preset.

The simulator, according to the invention, comprises movable elements representing at least some of the movable parts of the machine tool and designed to perform movements identical to those of the corresponding machine tool parts, means for determining the various positions assumed by the movable elements and adapted to furnish information for use in the presetting of the machine tool, a table for receiving a drawing of the component for the machining of which the machine tool is to be preset, a pantograph control device including a needle designed to be placed on an arbitrary point on the drawing and an index means indicating the position, on the machine tool, at which there will be located that point on the workpiece which corresponds to the point on the drawing at which the needle is located.

A preferred embodiment of the invention is illustrated by way of example in the accompanying drawings, in which:

FIG. 1 is a schematic pictorial view of an automatic turret lathe;

FIG. 2 is a pictorial view of the simulator for conjoint use with the lathe in accordance with the invention;

FIG. 3 is a rear elevational view of a detail of the simulator, on a larger scale;

Figure 4:
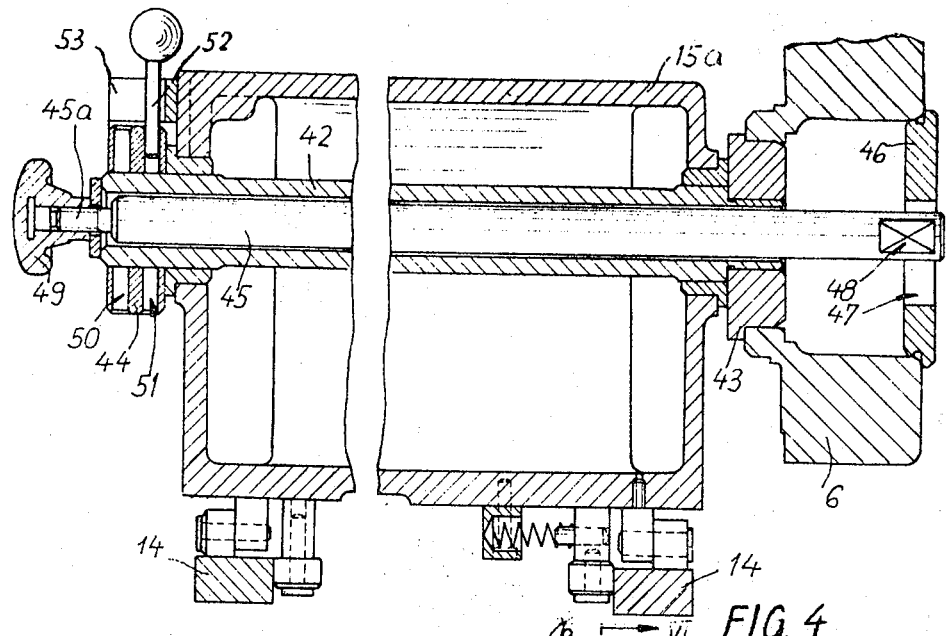
FIG. 4 is an axial section of another detail, likewise on a larger scale.

The automatic lathe, schematically illustrated in FIG. 1, has a base 1 carrying a headstock arrangement 2, the headstock spindle inclusive of the collet and chuck being referenced 3. The machine frame comprises a beam 4 on which is longitudinally slidable a pendent carriage 5 carrying a turret 6.

Carriage 5 mounts a drum 7 equipped with a plurality of longitudinally adjustable rods 8 each being provided with an axially movable sleeve 9 slidably mounted thereon. The drum 7 rotates in synchronism with turret 6 so that each of the rods 8 may be successively placed in an operative position in which the respective sleeve 9 carried thereby determines, during the course of the displacement of carriage 5, the commencement of the slow feed phase of the carriage, while the free outer extremity of the rod determines the end-of-travel position at which the carriage 5 is halted to define the termination of the carriage feed.

The bed 10 of the machine mounts a copying slide 11 which is movable longitudinally and is equipped with a copying device 12. The machine also has a rear slide which is not visible.

The simulator, schematically illustrated in FIG. 2, has a frame 13 of rectangular form, adapted to be mounted upon a wheeled carriage for ease of movement.

The frame 13 carries two longitudinally arranged rear rails 14 along which moves a turret carriage element 15 representing turret carriage 5 of the machine tool, and two longitudinal front rails 16 along which moves a copying slide element 17 representing copying slide 11 of the machine tool. Locking means 18 and 19 enable elements 15 and 17 to be locked upon their respective sets of rails.

The simulator also comprises two transverse rails 20 along which moves a rear slide element 21 representing the rear slide of the machine tool.

Figure 5:
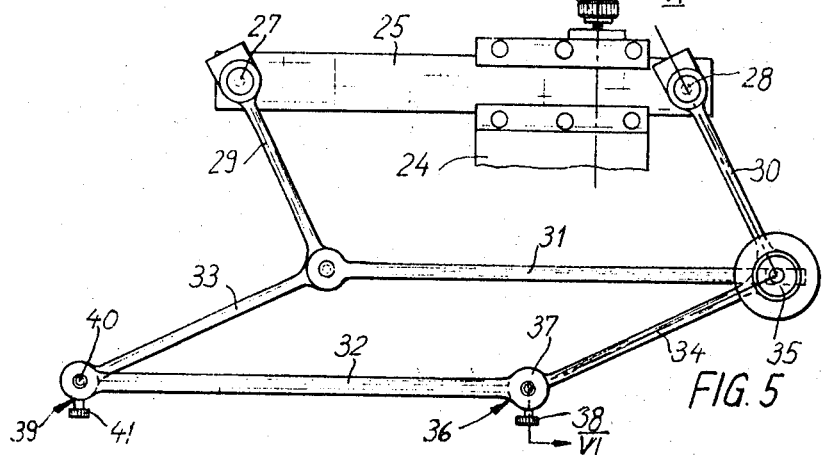
FIG. 5 is a plan view of another detail.
Figure 6:
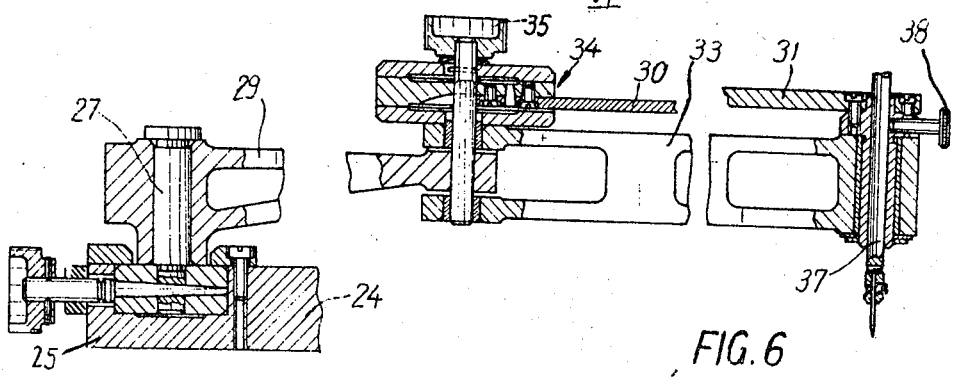
FIG. 6 is a section on the broken-line VI—VI of FIG. 1.

The frame 13 carries a bracket 22 forming a table for receiving a drawing 23 of the component for the machining of which the machine tool is to be preset. A bracket 24 on the frame 13 carries a slide 25, displaceable in the longitudinal direction, which can be locked in position by means of a screw 26. The slide 25 carries a pantograph control arrangement with two arms 29 and 30, articulated at 27 and 28 respectively to the slide, the two arms being of equal length. The arms carry an articulated parallelogram linkage, shown in detail in FIGS. 5 and 6, in the form of two long links 31 and 32 and two short links 33 and 34. This parallelogram linkage is articulated, through the two joints formed at the ends of the link 31, to the two ends of the arms 29 and 30, respectively, and is provided with a braking device 35, at the joint formed at the end of arm 30. This braking device prevents any uncontrolled movement between links 31 and 32 on the one hand, and between these links and arm 30 on the other, so that the parallelogram linkage has positional stability but can be moved sufficiently freely.

The parallelogram linkage mounts a needle 37 at the joint 36 between the links 32 and 34, locked by means of a screw 38, which needle is designed to move over table 22 and can thus be freely moved to any point on drawing 23. The parallelogram linkage is provided, at the joint 39 between the links 32 and 33, with an index 40 (FIG. 2) in the form of a rod which, at its free end, has a diametral reference flat. This rod is held in position by a locking screw 41.

The arrangement is such that the flat on the index 40 indicates the position at which, on the machine, there will be located that point on the workpiece which corresponds to the point on the drawing 23 at which the needle 37 is located.

It should be pointed out that displacement of slide 25 on bracket 24 permits the geometry of the pantograph device to be modified for a given position on the part of needle 37, so that positions which could interfere with the operator are avoided.

It should also be pointed out that index rod 40 can rotate about its own axis, enabling it to be angularly adjusted so that its reference flat is disposed in the direction of working of the tool which the machine is using, i.e. in particular axially or radially.

The movable element 15 of the simulator, representing turret carriage 5 of the machine, is provided at its forward part with a portion 15a (FIGS. 2 and 4) on which is temporarily fixed turret 6 of the tool-head of the machine. To this end, portion 15a carries a hollow spindle 42 rotatable about its own axis, which spindle is fixed at its forward end to a flange 43 adapted to carry turret 6, and, fixed at its rear end, to an index plate 44. The hollow spindle 42 is traversed by a locking rod 45 at the forward end of which is detachably fixed a disc 46 which retains turret 6. The said disc contains a slot 47 with which it engages two diametrically opposite flats 48 formed on the rod 45 near its front end. The axial locking of the rod 45 is effected by means of a knob 49 screwed on to the rear end 45a of the rod. The index plate 44 has two series of radial holes 50 and 51, numbering six and eight holes respectively. These holes are adapted to engage a pin 52 located in a component 53 of forked design carried by the portion 15a. In use, the operator selects one or other of the series of holes 50 and 51 in which to engage the pin 52, depending on whether the turret of the machine tool which is to be preset has six or eight stations.

In order to enable turret 6 to be mounted on the hollow spindle 42 in the position corresponding to a position, on the machine, in which one of the stations is aligned with headstock spindle 3, movable element 15 of the simulator carries a stop 53 against which bears a reference rod 54, shown in chain-dotted fashion in FIG. 2, this reference rod engaging in one of the stations of the turret. The position of the stop 53 is determined, in accordance with the diameter of the reference rod 54, by the fact that when the rod is bearing against the bottom face of the stop, the turret is correctly positioned. This arrangement enables the simulator to be employed in relation to turrets with both six and eight stations, without need to change any of the elements.

The element 15 of the simulator, which represents the turret carriage 5 of the machine, also carries a bracket 55 (FIGS. 2 and 3) adapted successively to receive the various stop rods 8 of the machine, equipped with their stop sleeves 9. These rods are longitudinally adjustable on the bracket 55 and can be locked by means of a screw 56. The simulator carries a stud 57 which forms a stop for the extremity of the rod 8 mounted on the bracket 55, and carries an arm 58 acting as a stop for the sleeve 9 on the said rod. The stud 57 and the arm 58 are fixed to a slide 59, which is itself locked in relation to the frame 13 by means of a screw 60 (FIG. 3). The arm 58 and the stud 57 constitute limit switch contacts of the machine, with which respectively co-operate the sleeves 9 carried by the rods 8, and the extremities of the rods themselves, in order respectively to control the commencement of the slow feed traverse of the turret carriage and the stopping of the carriage at the end of the traverse.

The presetting of the elements of the machine, which are associated with the turret, is effected as follows:

The needle 37 being, for example, placed at the bottom of a central hole, indicated by 61 on the drawing, this being a hole which is to be drilled in the workpiece, the pantograph system is locked by the brake 35. A twist drill 62, for drilling the hole 61, is fitted in that station of the stations of the turret 6 (the turret being in position upon the tool-head 15a) which is in the working position, i.e. in the position corresponding to the one in which this station will, on the machine, be in alignment with the headstock spindle 3. The movable element 15 is then displaced towards the right in FIG. 2 until the tip of the drill 62 strikes the flat on the index rod 40, the latter having previously been located so that the flat is in a plane perpendicular to the drill axis. The movable element 15 then has a position corresponding to the position which the turret carriage must occupy at the end of its traverse, the drill then being at the base of the hole 61 in the workpiece.

The element 15 is then locked in position, and the rod 8 is advanced on the bracket 55 until its end strikes the block 57. The rod is graduated and a lateral face 63 (FIG. 3) on the bracket 55 serves as a marker in relation thereto to enable the longitudinal position of the rod 8 to be read off, this reading being used during the subsequent positioning of the rod 8 on the drum 7 of the machine. It should be pointed out that the rod 8 can carry a moveable ring (not shown) which can be locked in position and applied against the face 63 of the bracket 55, this ring serving as a permanent marker determining the position of the rod 8 on the drum 7 and thus avoiding any need for taking a reading.

The movable element 15 is then unlocked, without changing the adjustment of the rod 8, and the element is brought into its extreme left-hand position. The needle 37 is then placed upon the axis of the component shown on the drawing, but at a point about 10 mm. in front of the component. The movable element 15 is then returned towards the right until the tip of the drill 62 strikes the flat on the index rod 40. The element 15 is then relocked in position and the sleeve 9 on the rod 8 is moved along until it strikes the arm 58. The sleeve 9 is then locked in this position on the rod 8, so that when fitted in the drum 7 of the machine, it determines the position at which commences the slow traverse of the turret carriage 5.

It should also be mentioned that the arm 58 is articulated to a screw 64 (FIG. 3) having a smooth shank portion, which is screwed into the slide 59, so that the arm can be lifted out of the way, with the result that it is not necessary to move the sleeve 9 on each rod 8 towards the rear end of the rod before placing the rod in position on the bracket 55.

The element 17 of the simulator, representing the copying slide 11 of the machine, has two oblique rails 65 (FIG. 2) on which is mounted a slide 66, which can be locked with the aid of a screw 67. This slide 66 represents the copying device 12 of the machine. The slide 66 is provided, at the position 68, with means, identical to those of the copying device proper, for fitting a tool.

The element 17 has a graduated scale 69 sliding longitudinally in a slot formed in a reference and 70 sliding longitudinally on the frame 13 of the simulator, locking of these latter two components in relation to one another being effected by a screw 71. The top face of the stud 70 has two indices 72 and 73, corresponding to markers on the machine and enabling the positions, occupied by the element 17 along the rails 16 which guide it, to be read off.

The longitudinal adjustment of the stud 70 is effected as follows. First of all, the element 17, representing the copying slide, is placed in its extreme righthand position, in which it is locked by means of the knob 19. Then the stud 70 is unlocked, by means of the screw 71, and moved until the index 72 is opposite the zero position on the graduated scale 69. The stud 70 is then finally locked in this position; the element 17 can then be used freely to effect the various adjustments.

The presetting of the copying slide of the machine is effected by noting the readings on the scale 69 when the tool fitted at 68 is in contact with the flat on the rod 40, and then transferring these readings to the corresponding adjusting elements of the machine.

In the example of a simulator above described, the element 21 representing the rear slide (not shown) of the machine, is not equipped with means for providing information on adjustment. It is designed instead, so that when a tool is fitted to it at 74 (FIG. 2), it is possible to check to ensure that the intended machining operations do not lead to any collision between a tool on the rear slide and a tool in the turret. In this connection, it will be realised that the fact that the position of the stops 57 and 58, as well as the positions of the indices 72 and 73, are longitudinally adjustable, means that the simulator can be adapted to cope with slight differences in the dimensions which may occur in different specimens of the same machine tool, so that the same simulator can be used for the presetting of several machines of the same type.

The final setting of the simulator which serves to preset the machine, before commencement of a production run, is carried out after one or more trial jobs have been produced and their sizes checked to enable the final settings to be made.

The above simulator design, due to the fact that it can use the drawings of the components which are to be machined, means that it is no longer necessary to make up specimens of the component, using for example non-automatic machines, and place them in the ultimate machine tool or in a conventional simulator in order to set up the machine.

Finally, it should be mentioned that in the example illustrated the pantograph system has a 1:1 ratio. Nevertheless, the case could well arise in which the pantograph device would have a different ratio and would produce, for example, a reduction, enabling drawings made to a scale of greater than 1:1 to be used, thus increasing the precision of working.

What I claim is:

1. In a simulator for use as an accessory for a machine tool incorporating a movable element in the setting of the machine tool preparatory to the machining of a workpiece therewith by means of an indexing mechanism preset on the simulator preliminary to transfer to operating position on the machine tool, the combination of:
 a frame,
 a slide element representative of the movable element of the machine tool and movable relative to the frame in traverses corresponding to the movable element working movements on the machine tool,
 tool receiving means mounted on the slide element,
 a table carried by the frame for supporting a drawing of the workpiece to be machined,
 a pantograph arrangement articulated on the frame,
 a needle mounted on the pantograph arrangement and selectively locatable over points on the workpiece of the drawing,
 an index mounted on the pantograph arrangement and movable responsively to the locating of the needle for indicating the position on the machine tool at which a point on the workpiece reflects the corresponding point on the workpiece of the drawing,
 and adjustable and removable indexing means for registering the positions of the movable elements on the machine tool according to the positions of the slide element at the commencement and termination of a simulated traverse.

2. The simulator as set forth in claim 1, the machine tool being an automatic turret lathe, the movable element being the turret carriage of the lathe, the slide element representing the turret carriage of the lathe, and including a rotary spindle carried by the slide element for mounting the turret of the turret lathe, and an indexing device on the spindle for the indexing of the spindle into a plurality of fixed angular positions.

3. The simulator as claimed in claim 1, for an automatic turret lathe, including a rotary spindle carried by the slide element for receiving the turret of the turret lathe, an indexing device on the spindle for the indexing of the spindle into a plurality of fixed angular positions, and locking means for locking the turret on the spindle in any desired angular position in relation thereto.

4. The simulator as claimed in claim 1, for an automatic turret lathe, including a rotary spindle carried by the slide element for receiving the turret of the turret lathe, an indexing device on the spindle for the indexing of the spindle into a plurality of fixed angular positions, locking means for locking the turret on the spindle in any desired angular position in relation thereto, a reference rod fitted in one of the stations of the turret, and a stop for engaging the reference rod with the turret occupying an angular position such that one of its stations is located in a position corresponding to the one in which it is in line with the headstock spindle of the turret lathe.

5. The simulator as claimed in claim 1, for an automatic turret lathe, including a rod detachably fixed to the turret carriage of the turret lathe, a lockable sleeve slidably mounted on the rod, means on the slide element for the attachment of the rod thereto, and a pair of stop means for the respective bearing against of the sleeve carried by the rod and the extremity of the rod as the slide element occupies the positions corresponding to the turret carriage positions in which the slow feed thereof respectively commences and terminates, the stop means enabling the longitudinal position of the rod determinant of the end-of-traverse position of the turret carriage to be read off for the placement of the rod in the corresponding longitudinal position in the turret lathe and enabling the sleeve to be located and locked on the rod in a longitudinal position determinant of the commencement of the slow feed movement of the turret carriage.

6. The simulator as claimed in claim 1, for an automatic lathe with a copying slide, the movable element being the copying slide of the lathe, the slide element representing the copying device of the lathe, and including a graduated scale integral with the slide element and an indicating mark in relation to which the graduated scale is movable for the reading of the various positions occupied by the slide element.

7. The simulator as claimed in claim 1, for an automatic lathe with a copying slide, the movable element being the copying slide of the machine, the slide element representing the copying device of the lathe, and including a graduated scale integral with the slide element and a plurality of marks located opposite the movable graduated scale and corresponding to marks carried by the copying slide of the lathe.

8. A simulator as claimed in claim 1, the pantograph arrangement comprising an articulated parallelogram at one of the joints of which the needle is fixed and at another joint of which the index is fixed.

9. In a simulator as claimed in claim 1, an articulated parallelogram constituting the pantograph arrangement at one of the joints of which the needle is fixed and at another joint of which the index is fixed with two arms carrying the parallelogram at its other two joint positions and to the extremities of which the parallelogram is articulatingly connected, the two arms being articulated through their other extremities to the frame.

10. In a simulator as claimed in claim 1, an articulated parallelogram constituting the pantograph arrangement at one of the joints of which the needle is fixed and at another joint of which the index is fixed with two arms carrying the parallelogram at its other two joint positions and to the extremities of which the parallelogram is articulatingly connected, the two arms being articulated through their other extremities to the frame, and including a braking device precluding uncontrolled relative movement between its links on the one hand and between its links and that of the arms which is fitted to the joint on the other hand, so that when the braking device is locked the parallelogram system is stable and yet capable of flexing.

11. In a simulator as claimed in claim 1, an articulated parallelogram constituting the pantograph arrangement at one of the joints of which there is fixed the needle and at another joint of which there is fixed the index, two arms carrying the parallelogram arrangement at its other two joint positions and to the extremities of which the parallelogram arrangement is articulatingly connected, and a slide displaceable on the frame to which the two arms are articulated through their other extremities.

12. A simulator as claimed in claim 1, in which the slide element carrying reference means is mounted for moving and being locked for the presetting of different specimens of one and the same machine type for the displacement of the slide element to compensate for any differences in size occurring between different specimens.

13. A simulator as claimed in claim 1, in which the index is constituted by a rod with a diametral reference flat, the rod being assembled so as to be able to turn about its own axis in order to orientate the reference flat in any direction.

14. A simulator for use conjointly with a machine tool incorporating a plurality of movable elements in the presetting of the machine tool preparatory to the machining of a workpiece therewith comprising:
   a frame,
   a plurality of slide elements each representative of one of the movable elements of the machine tool and movable relative to the frame correspondingly to the movable element movement on the machine tool,
   a tool receiving means mounted on each slide element,
   a table carried by the frame for supporting a drawing of the workpiece to be machined,
   a slide device mounted on and longitudinally displaceable relative to the frame,
   a pantograph control articulated on the slide device,
   a needle carried by the pantograph control and being selectively locatable on a point on the workpiece on the drawing,
   an index carried by the pantograph control and movable respectively to the locating of the needle for indicating a position on the machine tool at which a point on the workpiece reflects the corresponding point on the drawing,
   means for determining the positioning of each of the movable elements according to the positions of the respective slide element at the commencement and termination of its working traverse,
   adjustable means mounted on each of the slide elements for indicating the positions of the respective slide elements at the commencement and termination of its working traverse and being transferable to the machine tool for indicating the corresponding positions of the respective movable element.

15. A simulator for use conjointly with a machine tool incorporating a movable element in the presetting of the machine tool preparatory to the machining of a workpiece therewith comprising:
   a frame,
   a slide element representative of the movable element of the machine tool and movable relative to the frame correspondingly to the movable element movement on the machine tool,
   a tool receiving means mounted on the slide element,
   a table carried by the frame for supporting a drawing of the workpiece to be machined,
   a slide mounted on and longitudinally displaceable relative to the frame,
   a pantograph control articulated on the slide element,
   a needle carried by the pantograph control and being selectively locatable on a point on the workpiece on the drawing,
   an index carried by the pantograph control and movable responsively to the locating of the needle for indicating a position on the machine tool at which a point on the workpiece reflects the corresponding point on the drawing,
   means for determining the positioning of the movable element according to the positions of the slide element at the commencement and termination of a working traverse adjustable means mounted on the slide element for indicating the positions of the slide element at the commencement and termination of a working traverse and being transferable to the machine tool for indicating the corresponding positions of the movable element.

16. The simulator as set forth in claim 15, for an automatic turret lathe, the movable element being the turret carriage of the machine tool, the slide element representing the turret carriage of the lathe, a rotary spindle carried by the slide element and arranged for receiving the turret of the turret lathe, and an indexing device on the spindle for indexing of the spindle into a plurality of fixed angular positions.

17. The simulator as claimed in claim 15 for an automatic turret lathe, including a rotary spindle carried by the slide element and arranged for receiving the turret of the turret lathe, an indexing device on the spindle for allowing indexing of the spindle into a plurality of fixed angular positions, and locking means for locking the turret on the spindle in any desired angular position in relation thereto.

18. The simulator as claimed in claim 15, for an automatic turret lathe, including a rotary spindle carried by the slide element and arranged for receiving the turret of the turret lathe, an indexing device on the spindle for allowing indexing of the spindle into a number of fixed angular positions, locking means for locking the turret on the spindle in any desired angular position in relation thereto, a reference rod fitted in one of the stations of the turret, and a stop for the bearing of the reference rod thereagainst whereby the turret occupies an angular position such that one of its stations is located in a position corresponding to the one in which it is in line with the headstock spindle.

19. The simulator as claimed in claim 15, for an automatic turret lathe, including a rod detachably fixed to the turret carriage, a lockable sleeve slidably mounted on the rod, means on the slide element for the attachment of the rod, a pair of stop means for the respective bearing against of the sleeve carried by the rod and the extremity of the rod as the slide element occupies the positions corresponding to the carriage positions in which the slow feed thereof respectively commences and stops, the stop means enabling the longitudinal position of the rod determining the end-of-traverse position of the carriage to be read off so that the rod can be placed in the same longitudinal position in the turret lathe and also enabling the sleeve to be located and locked on the rod in a longitudinal position in which it determines the commencement of the slow feed movement of the turret carriage.

References Cited
UNITED STATES PATENTS

| | | | |
|---|---|---|---|
| 2,083,588 | 6/1937 | Anderson | 33—25(C) |
| 2,929,288 | 3/1960 | Harvey et al. | 33—25X(A) |
| 3,417,478 | 12/1968 | Jeanneret | 33—185 |
| 3,417,661 | 12/1968 | Dancsik | 33—25X(A) |

WILLIAM D. MARTIN, JR., Primary Examiner

U.S. Cl. X.R.

33—25; 82—14; 90—13.1